No. 720,277. PATENTED FEB. 10, 1903.
C. M. NELSON & J. A. CHRISTIANSON.
METALLIC SHIPPING VESSEL.
APPLICATION FILED SEPT. 16, 1902.

NO MODEL.

Witnesses
F. A. Barrow.
M. L. Schroder.

Inventors;
Chas. M. Nelson
John A. Christianson
by Milo B. Stevens & Co.
Attorneys.

UNITED STATES PATENT OFFICE.

CHARLES M. NELSON AND JOHN A. CHRISTIANSON, OF CHICAGO, ILLINOIS.

METALLIC SHIPPING VESSEL.

SPECIFICATION forming part of Letters Patent No. 720,277, dated February 10, 1903.

Application filed September 16, 1902. Serial No. 123,634. (No model.)

*To all whom it may concern:*

Be it known that we, CHARLES M. NELSON and JOHN A. CHRISTIANSON, citizens of the United States, residing at Chicago, in the county of Cook and State of Illinois, have invented certain new and useful Improvements in Metallic Shipping Vessels; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention embodies a metallic shipping vessel particularly designed and adapted for carrying and handling condensed or powdered inks, dyes, and the like.

The object of the invention is to form an article in which such substances may be safely carried in the mails or otherwise and conveniently handled and emptied without danger of spilling the stuff or soiling the hands.

An embodiment of the invention is illustrated in the accompanying drawings, in which—

Figure 1:
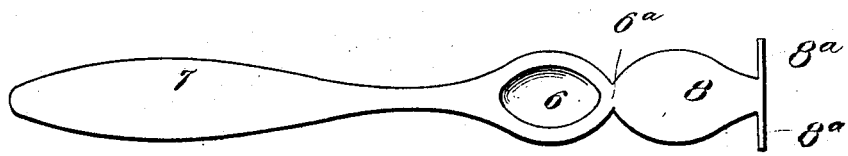
Figure 2:
Figure 3:

Figure 1 is a plan view of the blank of which the vessel is formed. Fig. 2 is a plan view of the vessel closed, and Fig. 3 is an edge view thereof.

The article is preferably made of thin flexible metal and comprises a spoon-shaped holder formed by embossing or indenting the blank, as at 6, provided with a handle portion 7 and a cover portion 8. At the end of the cover are two laterally-extending arms $8^a$.

In use the ink or dyestuff is placed in the bowl of the holder, and the cover is bent over at the neck $6^a$ to rest tightly upon the edge of the bowl. The arms $8^a$ are then bent around the holder, as shown, which holds the cover on the bowl until it is desired to dissolve or remove the stuff within, when the article may be conveniently grasped by the handle and opened with any convenient blade.

The article will be found particularly useful in mail-order business for sending condensed inks and the like through the mail. It is likewise adapted for the transportation of dyes, gums, and other powdered or viscous substances.

What we claim is—

A metallic shipping vessel formed of one piece of thin flexible metal, comprising a bowl, having a handle joined to one side and a cover joined to the other, and arms projecting from the cover and embracing the handle, substantially as described.

In testimony whereof we affix our signatures in presence of two witnesses.

CHARLES M. NELSON.
JOHN A. CHRISTIANSON.

Witnesses:
NELLIE FELTSKOG,
H. G. BATCHELOR.